(12) United States Patent
Siddiqui et al.

(10) Patent No.: US 9,837,956 B2
(45) Date of Patent: Dec. 5, 2017

(54) HEAT EXCHANGER FOR PHOTOVOLTAIC PANELS

(71) Applicant: KING FAHD UNIVERSITY OF PETROLEUM AND MINERALS, Dhahran (SA)

(72) Inventors: Muhammad Usama Siddiqui, Dhahran (SA); Abul Fazal Muhammad Arif, Dhahran (SA); Syed M. Zubair, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 439 days.

(21) Appl. No.: 14/242,847

(22) Filed: Apr. 1, 2014

(65) Prior Publication Data

US 2015/0280040 A1    Oct. 1, 2015

(51) Int. Cl.
H02S 40/42       (2014.01)

(52) U.S. Cl.
CPC .................................. H02S 40/425 (2014.12)

(58) Field of Classification Search
CPC .............................. H02S 40/425; Y02E 10/44
USPC ........................................................ 136/246
See application file for complete search history.

(56) References Cited

U.S. PATENT DOCUMENTS 4,027,821 A * 6/1977 Hayes ...................... F24J 2/205
                                                        122/37
2008/0236646 A1   10/2008 Kelly et al.
2012/0060898 A1   3/2012  Ahlgren et al.
2012/0152498 A1   6/2012  Lyon
2012/0175082 A1   7/2012  Kmetovicz et al.
2012/0247538 A1 * 10/2012 Zhao ...................... H02S 40/44
                                                        136/248
2012/0274215 A1   11/2012 Gostein et al.
2013/0000699 A1   1/2013  Lester

OTHER PUBLICATIONS

Zauscher, Melanie D., *Solar Photovoltaic Panels From a Heat Transfer Perspective*, Paper from the Department of Mechanical and Aerospace Engineering of the University California, San Diego, Dec. 7, 2006.
Tong et al. "Geometric strategies for attainment of identical outflows through all of the exit ports of a distribution manifold in a manifold system", Applied thermal Engineering, vol. 29 (2009) pp. 3552-3560.

* cited by examiner

*Primary Examiner* — Shannon Gardner
(74) *Attorney, Agent, or Firm* — Oblon, McClelland, Maier & Neustadt, L.L.P.

(57) ABSTRACT

The heat exchanger for photovoltaic (PV) panels is a heat exchanger that maintains a uniform temperature for cooling PV modules. The heat exchanger is a box-shaped enclosure attached to the rear face of the PV panel. The enclosure has an inlet end, an outlet end, and a plurality of parallel baffles disposed between the ends defining a plurality of channels dividing fluid flow through the enclosure into parallel paths. The spaces between the ends of the baffles and the inlet and outlet ends define an inlet header and an outlet header. In one embodiment, the fluid inlet and outlet are disposed in diagonally opposite corners of the disclosure, opening into triangular input and output headers. In another embodiment, the fluid inlet and outlet are centered at the ends of the enclosure, and the outlet header is V-shaped with the vertex extending into the enclosure along its centerline.

4 Claims, 6 Drawing Sheets

HEAT EXCHANGER FOR PHOTOVOLTAIC PANELS

BACKGROUND OF THE INVENTION

1. Field of the Invention

The present invention relates to heat exchange systems, and particularly to various embodiments of a heat exchanger for photovoltaic panels. The heat exchanger optimizes the flow paths of the coolant therethrough to provide more uniform temperature distribution.

2. Description of the Related Art

Solar energy can be used in a variety of ways to generate electricity. One way is to use solar thermal power systems that utilize solar energy to raise the temperature of a working fluid, which is then used to run a turbine engine. A second way is to use photovoltaic (PV) systems that generate electricity directly from sunlight. The use of PV systems has increased greatly in recent decades due to significant reductions in PV system costs and improvements in PV system component performance. At present, PV modules convert around 12-20% of solar energy into electricity, while the remaining energy increases the panel temperature. This increase in temperature causes the module efficiency to decrease and results in thermal stress development in the module. Cooling of PV panels provides a method to reduce the PV cell temperature to ensure that the PV cells operate at high efficiencies and do not develop structural defects due to high thermal stresses and stress cycling during day-to-day operation. The attached heat exchanger also serves the additional purpose of collecting thermal energy in the form of hot water, which increases the overall energy collection efficiency of the system.

A number of studies have been done to combine the photovoltaic panel with flat plate solar thermal collector into a single collector called the photovoltaic/thermal (PV/T) collector. These include studies in which off-the-shelf PV panels were cooled by heat exchangers, and studies in which custom-made PV/T collectors specially designed for thermal energy collection along with electricity generation were developed. All of these studies used parallel channel heat exchangers. Some commercial auxiliary thermal collectors for off-the-shelf PV panels, as well as custom PV/T collectors, have also appeared in the market.

It has been observed that in parallel channel heat exchangers, flow is not uniformly distributed between the channels. Moreover, PV panels are usually mounted in a sloped configuration, which further increases the non-uniformity of flow. This results in large temperature gradients across the PV modules that are being cooled. This can lead to degradation of electrical performance due to cell-mismatch losses. It has been found that the electrical performance increased by as much as 9% for the case when the flow was most uniform.

A variety of factors control the flow distribution in heat exchangers. These include the ratio of the cross-sectional area of the header to the cross-sectional area of the channels, the arrangement of flow channels that control the flow direction, the fluid inlet conditions, flow resistance inside the header and channels, entrance effects at the openings of the channels, and gravity effects. It has been found that buoyancy effects increase with a decrease in the flow rate through the collector. Several geometric strategies for header design with an objective to achieve uniform flows in all channels of the heat exchanger have been developed as a result of studies of the effects of several factors on the uniformity of flow. These included varying the width of the headers on the inlet and the outlet sides, using linearly and non-linearly tapered headers, and using channels of different widths. Out of all the factors studied, it has been found that the widths of the inlet and outlet side headers were the most important. The effects of using linearly tapered headers, multi-stepped headers and using the baffle plates and baffle tubes have also been studied. The effects of channel layouts on the flow and temperature uniformity inside a micro channel heat exchanger have also been studied. Several parallel channel layouts, serpentine layouts and distributor layouts have been compared based on average surface temperature, temperature non-uniformity and pumping power.

Thus, a heat exchanger for photovoltaic panels solving the aforementioned problems is desired.

SUMMARY OF THE INVENTION

The heat exchanger for photovoltaic (PV) panels is a heat exchanger that maintains a uniform temperature for cooling PV modules. The heat exchanger is a box-shaped enclosure attached to the rear face of the PV panel. The enclosure has an inlet end, an outlet end, and a plurality of parallel baffles disposed between the ends defining a plurality of channels dividing fluid flow through the enclosure into parallel paths. The spaces between the ends of the baffles and the inlet and outlet ends define an inlet header and an outlet header. In one embodiment, the fluid inlet and outlet are disposed in diagonally opposite corners of the disclosure, opening into triangular input and output headers. In another embodiment, the fluid inlet and outlet are centered at the ends of the enclosure, and the outlet header is V-shaped with the vertex extending into the enclosure along its centerline.

The positions of the fluid inlet and the fluid outlet and the shapes of the inlet and outlet headers are shaped so that in combination, they reduce the average surface temperature, improve flow uniformity, reduce the temperature gradient across the heat exchanger surface, and minimize pumping power requirements. The combinations were designed in accordance with a computational fluid dynamics (CFD) model, and the selected combinations were validated by comparison of temperatures predicted by the CFD model with temperatures predicted by an analytical model, and by comparison of the variation of flow non-uniformity with change in header width predicted by the CFD model with values reported in the literature.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
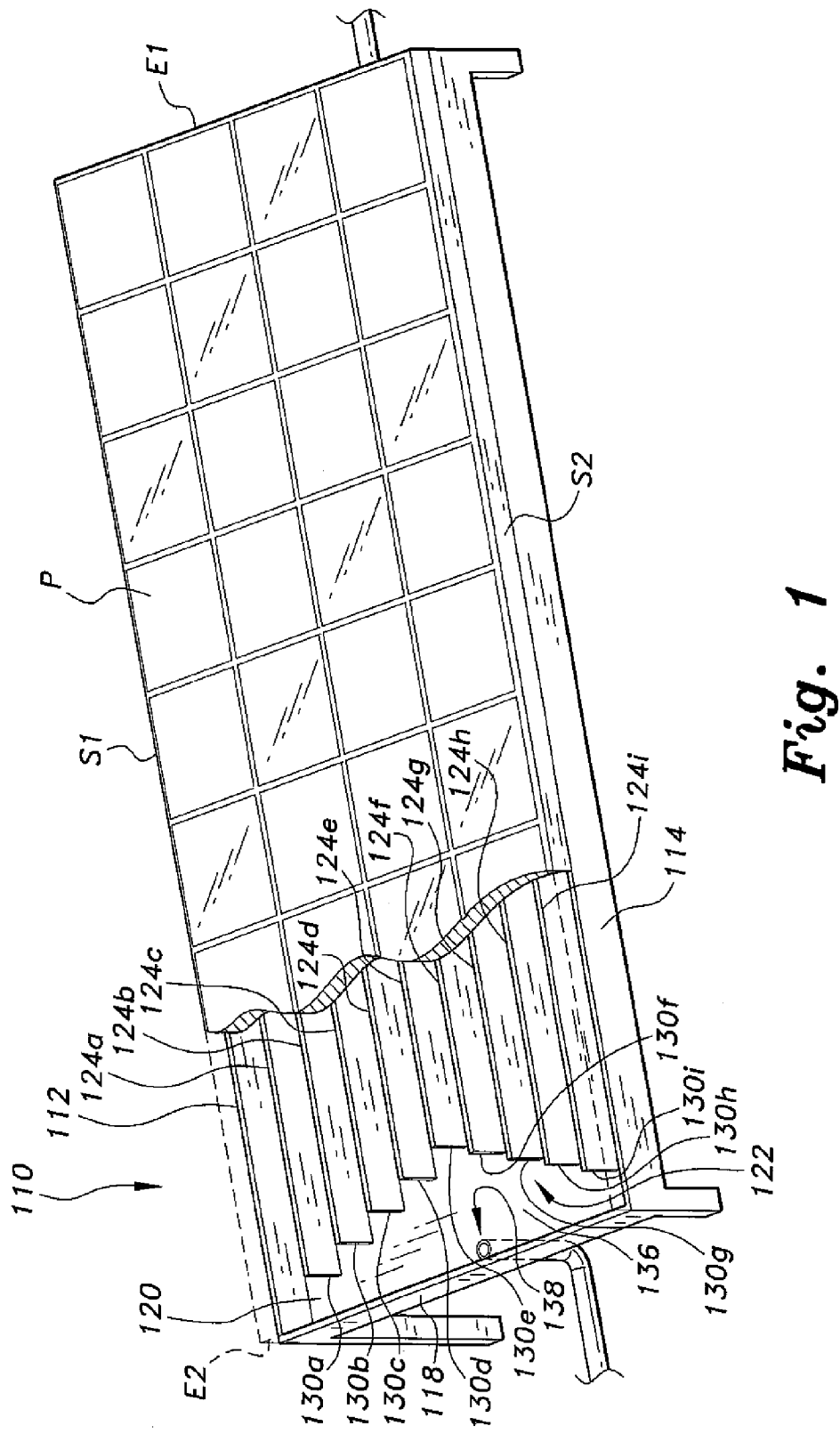
FIG. 1 is a perspective view of a heat exchanger for photovoltaic panels according to the present invention, showing the heat exchanger installed beneath a photovoltaic panel, the photovoltaic panel being partially broken away to show a portion of the heat exchanger.

The heat exchanger for photovoltaic (PV) panels is a heat exchanger that maintains a uniform temperature for cooling PV modules. The heat exchanger is a box-shaped enclosure attached to the rear face of the PV panel. The enclosure has an inlet end, an outlet end, and a plurality of parallel baffles disposed between the ends defining a plurality of channels dividing fluid flow through the enclosure into parallel paths. The spaces between the ends of the baffles and the inlet and outlet ends define an inlet header and an outlet header. In one embodiment, the fluid inlet and outlet are disposed in diagonally opposite corners of the disclosure, opening into triangular input and output headers. In another embodiment, the fluid inlet and outlet are centered at the ends of the enclosure, and the outlet header is V-shaped with the vertex extending into the enclosure along its centerline.

The heat exchanger for photovoltaic panels includes two embodiments that were optimized according to computational fluid dynamics (CFD). The heat exchanger reduces the average surface temperature, improves flow uniformity, and reduces the temperature gradient across the heat exchanger surface while minimizing the pumping power requirements for a specified heat duty. The heat exchanger is a basic heat exchanger design that can be fitted to the back of an off-the-shelf PV module. A variety of design parameters were modified to study their influence on the heat exchanger performance. Based on three performance metrics (average surface temperature, surface temperature non-uniformity, and heat transfer rate per unit pumping power), the best channel layout designs were selected and their performance was tested for different operating conditions.

In the equations that follow, the variables and constants are identified in Table 1, below.

TABLE 1

| Symbol | Quantity | Symbol | Quantity |
|---|---|---|---|
| $A_c$ | Heat exchanger top surface area (m²) | S | Heat flux (W/m²) |
| $C_p$ | Specific heat capacity (J/kg · K) | T | time (s) |
| $C_\mu$, $C_{\epsilon 1}$, $C_{\epsilon 2}$ | Constants for turbulence model | T(x, y, z) | Temperature field (K) |
| D | Heat exchanger channel width (m) | $T_{f,\,avg}$ | Average fluid temperature (K) |
| $f_{darcy}$ | Darcy friction factor | $T_{f,\,in}$ | Inlet fluid temperature (K) |
| F | Fin efficiency factor | $T_{f,\,out}$ | Outlet fluid temperature (K) |
| F' | Collector efficiency factor | $\overline{T}_s$ | Average surface temperature (K) |
| $F_{flow}$ | Flow factor | u | Fluid velocity (m/s) |
| $F_R$ | Collector heat removal factor | $V_{f,\,in}$ | Inlet fluid velocity (m/s) |
| $h_f$ | Convection coefficient between heat exchanger and working fluid (W/m² K) | $U_L$ | Overall heat loss coefficient (W/m² k) |

TABLE 1-continued

| Symbol | Quantity | Symbol | Quantity |
|---|---|---|---|
| k | Turbulent kinetic energy (m²/s²) | W | Heat exchanger channel pitch (m) |
| $k_c$ | Heat exchanger material thermal conductivity (W/m K) | $\dot{W}_{pump}$ | Pumping power |
| $k_w$ | Water thermal conductivity (W/m K) | δ | Thickness of heat exchanger top plate (m) |
| $\dot{m}$ | Mass flow rate (kg/s) | $\Delta T_s$ | Surface temperature non-uniformity (K) |
| Nu | Nusselt's number | E | Turbulent dissipation rate (m²/s³) |
| $P_k$ | Production term | P | Density (kg/m³) |
| Pr | Prandtl's number | $\sigma_\epsilon$ | Turbulent Prandtl number for ε |
| q | Heat conduction (W) | $\sigma_k$ | Turbulent Prandtl number for k |
| $Q_{vh}$ | Viscous energy dissipation (W/m³) | μ | Dynamic viscosity (Pa · s) |
| $\dot{Q}$ | Heat transferred to fluid in heat exchanger (W) | $\mu_T$ | Turbulent viscosity (Pa · s) |
| $Re_{channel}$ | Reynolds number | | |

A computational fluid dynamics (CFD) models was designed as follows. The heat exchanger consists of two domains: a solid domain for the heat exchanger body, and a fluid domain for the working fluid. Heat transfer in the heat exchanger is calculated by solving the energy equations (1) and (2):

$$\rho C_p \frac{\partial T(x,\,y,\,z)}{\partial t} = \nabla \cdot q \tag{1}$$

$$\rho C_p \frac{\partial T}{\partial t} + \rho C_p u \cdot \nabla T(x,\,y,\,z) = \nabla \cdot (q) + Q_{vh}, \tag{2}$$

where:

$$q = k_{cond} \nabla T \tag{3}$$

and ρ is the density, $C_p$ is the specific heat capacity, T(x,y,z) is the temperature, t is the time, $k_{cond}$ is the thermal conductivity, q is the heat transferred by conduction, Q is the internal heat generation, u is the fluid velocity and $Q_{vh}$ is the viscous dissipation.

To determine the flow distribution inside the heat exchanger, the momentum and continuity equations given by equations (4) and (5) need to be solved:

$$\rho \frac{\partial u}{\partial t} + \rho(u \cdot \nabla)u = \nabla \cdot \left[ -pI + (\mu + \mu_T)(\nabla u + \nabla u^T) - \frac{2}{3}\rho kI \right] \tag{4}$$

$$\rho \nabla \cdot u = 0, \tag{5}$$

where p is the pressure, μ is the viscosity, $\mu_T$ is the turbulent viscosity, and k is the turbulent kinetic energy. The k-ε model given by equations (6)-(9) was used to include the turbulence effects in the model:

$$\rho \frac{\partial k}{\partial t} + \rho(u \cdot \nabla)k = \nabla \cdot \left[ \left( \mu + \frac{\mu_T}{\sigma_k} \right) \nabla k \right] + P_k - \rho \varepsilon \tag{6}$$

$$\rho \frac{\partial \varepsilon}{\partial t} + \rho(u \cdot \nabla)\varepsilon = \nabla \cdot \left[ \left( \mu + \frac{\mu_T}{\sigma_\varepsilon} \right) \nabla \varepsilon \right] + C_{\varepsilon 1} \frac{\varepsilon}{k} P_k - C_{\varepsilon 2} \rho \frac{\varepsilon^2}{k} \tag{7}$$

$$\mu_T = \rho C_\mu \frac{k^2}{\varepsilon} \qquad (8)$$

$$P_k = \mu_T[\nabla u:(\nabla u + (\nabla u)^T)], \qquad (9)$$

where $P_k$ is production term and e is the turbulent dissipation rate. The values of the model constants are $C_\mu=0.09$, $C_{\varepsilon 1}=1.44$, $C_{\varepsilon 2}=1.92$, $\sigma_k=1.0$ and $\sigma_\varepsilon=1.3$.

The above CFD model was implemented in a commercial computational fluid dynamics code (ANSYS CFX, version 12.1, Ansys, Inc., 2010). To see the effect of variation of the heat exchanger design parameters and to optimize its design, a basic ten parallel channel layout was designed. The basic design was assumed to consist of two thin flat plates between which thin walls formed the flow channel layout. The thickness of the flat plates and the walls was assumed to be 5 mm. The selected dimensions of the heat exchanger were such that it would be able to fit inside the frame of a commercially available PV module. The module was assumed to be mounted at an angle of 40°, which resulted in the effect of buoyancy becoming important. A heat flux of 1000 W/m² was applied to the top surface of the heat exchanger. The magnitude of the heat flux is not important, since the various simulated designs were examined relative to each other.

In order to validate the model, two validations were carried out. First, the predicted temperatures by the CFD model were compared with the predicted temperatures by an analytical model. In the second approach, the variation of flow non-uniformity with change in header width predicted by the model was compared with the values reported in the literature.

The temperatures predicted by the model were compared with an analytical model given by equations (10) through (20) for the simple 10 parallel channel heat exchanger case (see H. C. Hottel et al., "Evaluation of flat-plate solar collector performance", Transactions of the Conference on Use of Solar Energy, Vol. 2 (1955), p. 74-108). Two cases with different operating conditions were compared. In both cases, a heat flux, S, of 1000 W/m² was applied to the top surface of the heat exchanger and the inlet fluid temperature, $T_{f,in}$, was set equal to 298 K. The parameters varied were the inlet fluid velocity, $V_{f,in}$, and the overall heat loss coefficient, $U_L$. The average fluid temperature, $T_f$, outlet fluid temperature, $T_{f,out}$, and the average surface temperature, $\bar{T}_s$, as calculated by the ANSYS CFX-implemented CFD model were compared with the analytical model as presented by Hottel et al. The results, as shown in Table 2, for both models are very close, but the analytical model predicts slightly higher fluid temperatures and slightly lower top surface temperatures. This is because the analytical model assumes equal flow in all channels, which results in better heat transfer to the fluid, which increases the fluid temperature and decreases the temperature non-uniformity on the top surface and decreases the average top surface temperature. Equations (10)-(20) are as follows:

$$Nu = \frac{(f_{darcy}/8)\cdot(\text{Re}_{channel}-1000)\cdot Pr}{1.07+12.7\cdot(f_{darcy}/8)^{0.5}\cdot(Pr^{2/3}-1)}\cdot(\mu/\mu_w)^{0.11} \qquad (10)$$

$$h_f = \frac{Nu k_w}{D_h} \qquad (11)$$

$$m = \sqrt{\frac{U_L}{k_c \delta}} \qquad (12)$$

$$F = \frac{\tanh\left(m\frac{W-D}{2}\right)}{m\frac{W-D}{2}} \qquad (13)$$

$$F' = \frac{1/U_L}{W\cdot\left(\frac{1}{U_L\cdot(D+(W-D)\cdot F)}+\frac{1}{h_f\cdot D}\right)} \qquad (14)$$

$$F_{flow} = \frac{\dot{m}\cdot C_D}{A_c\cdot U_L\cdot F'}\cdot\left(1-\exp\left(-\frac{A_c\cdot U_L\cdot F'}{\dot{m}\cdot C_p}\right)\right) \qquad (15)$$

$$F_R = F_{flow}\cdot F' \qquad (16)$$

$$\dot{Q} = F_R\cdot A_c\cdot(S-U_L(T_{f,in}-T_{amb})) \qquad (17)$$

$$T_{f,avg} = T_{f,in}+\frac{\dot{Q}/A_c}{F_T\cdot U_L}\cdot(1-F_{flow}) \qquad (18)$$

$$T_{f,out} = T_{f,in}+\frac{\dot{Q}}{\dot{m}\cdot C_p} \qquad (19)$$

$$\bar{T}_s = T_{f,in}+\frac{\dot{Q}/A_c}{F_R\cdot U_L}\cdot(1-F_R). \qquad (20)$$

TABLE 2

Comparison of CFD model with Hottel et al. analytical model

| Operating Condition | $V_{f,in}$ = 0.3 m/s, $U_L$ = 5 W/m² K | | $V_{f,in}$ = 0.5 m/s, $U_L$ = 2 W/m²K | |
|---|---|---|---|---|
| | CFD model | Analytical model | CFD model | Analytical model |
| $T_{f,avg}$ | 298.4 K | 299.1 K | 298.3 K | 298.7 K |
| $T_{f,out}$ | 298.6 K | 300.2 K | 298.5 K | 299.3 K |
| $\bar{T}_s$ | 300.4 K | 299.8 K | 299.7 K | 299.1 K |

As a second validation, the flow non-uniformity predicted by the developed CFD model for different header sizes was compared with flow non-uniformity predicted by Tong et al. "Geometric strategies for attainment of identical outflows through all of the exit ports of a distribution manifold in a manifold system", Applied Thermal Engineering, Vol. 29 (2009) pp. 3552-3560. The metric for comparison was the standard deviation of the flow rates inside the channels relative to the mean flow rate. For an average channel Reynolds number of 700, the flow non-uniformity was calculated for three different header width-to-channel width ratios. The results are presented in Table 3.

TABLE 3

Comparison of effect of header width: CFD model v. Tong et al.

| | Flow non-uniformity | |
|---|---|---|
| Header width to channel width ratio | CFD model | Tong et al. |
| 2.1 | 102.4% | 127% |
| 2.8 | 82.4% | 95% |
| 4.2 | 59.0% | 63% |

The comparison with Tong et al. shows the same qualitative behavior with the increase in header width. The difference in the absolute value of the flow non-uniformity is due to the difference in inlet locations. In the CFD model, the inlet is located in the bottom wall of the heat exchanger, while Tong et al. took the inlet on the side wall of the heat exchanger. The two validation checks tended to confirm that our ANSYSD CFX-implemented CFD model is a useful model for the design of parallel channel heat exchangers, so that the CFD model was used to optimize the design of heat exchangers, as described below.

In order to compare the various heat exchangers designs, some quantifiable performance metrics were required. One study presented several performance metrics for comparing heat exchangers. These included metrics for comparing the thermal performance of the heat exchanger as well as uniformity of flow among the channels. Since the objective of the current work was to design heat exchangers for cooling commercially available PV panels, from an end-user point of view, only the thermal characteristics were important. Therefore, the thermal characteristics of the various heat exchanger designs were compared by comparing the following three metrics.

The average temperature on the heat exchanger surface ($T_s$) determines the average PV cell temperature that directly affects the characteristics of a PV module. Higher PV cell temperatures deteriorate PV electrical performance. Therefore, lower values of $T_s$ are desirable. The average surface temperature was calculated using the following Eq. (21):

$$\overline{T}_s = \frac{1}{A}\int_A T_s dA. \qquad (21)$$

As was mentioned before, temperature gradients in PV modules are undesirable because of the adverse effects on the electrical and structural performance of the modules. Therefore, designs with lower values of surface temperature non-uniformity that is the difference between the maximum and minimum surface temperatures were considered better. Equation (22) gives the surface temperature non-uniformity as:

$$\Delta T_s = T_{s,max} - T_{s,min}. \qquad (22)$$

The heat transfer per unit pumping power is the ratio of the energy gained by the working fluid inside the heat exchanger to the pumping power required to operate the heat exchanger. The pumping power required is dependent on the flow rate of the working fluid and the pressure drop in the heat exchanger and is given by Equation (23). Equation (24) is used to calculate the energy gained by the working fluid, and Equation (25) gives the heat transfer per unit pumping power. Whereas the previous two performance metrics, given by equations (21) and (22), are important for PV module cooling application, the heat transfer per unit pumping power is related to the performance of the heat exchanger itself. Equations (23) through (25) are as follows:

$$\dot{W}_{pump} = \frac{\dot{m}}{\rho}\Delta P \qquad (23)$$

$$\dot{Q} = \dot{m}C_p(T_{f,out} - T_{f,in}) \qquad (24)$$

$$\frac{\dot{Q}}{\dot{W}_{pump}} = \frac{\rho C_p(T_{f,out} - T_{f,in})}{\Delta P} \qquad (25)$$

Modifications were made to several design parameters of the heat exchanger and their influence on the heat exchanger performance was observed. In all the simulations, the inlet velocity of water was set to be 0.3 m/s which resulted in an inlet Reynolds number of around 6500 and turbulent flow.

The effects of various design changes that were made to the basic ten parallel channels design were evaluated. The modifications made to the basic design included changing the number of channels, varying the sizes of the inlet- and outlet-side headers, using variable lengths of the channels, varying the positions of the inlets and outlets and using series-parallel combinations. In total fourteen channel layout designs were simulated.

Figure 3:
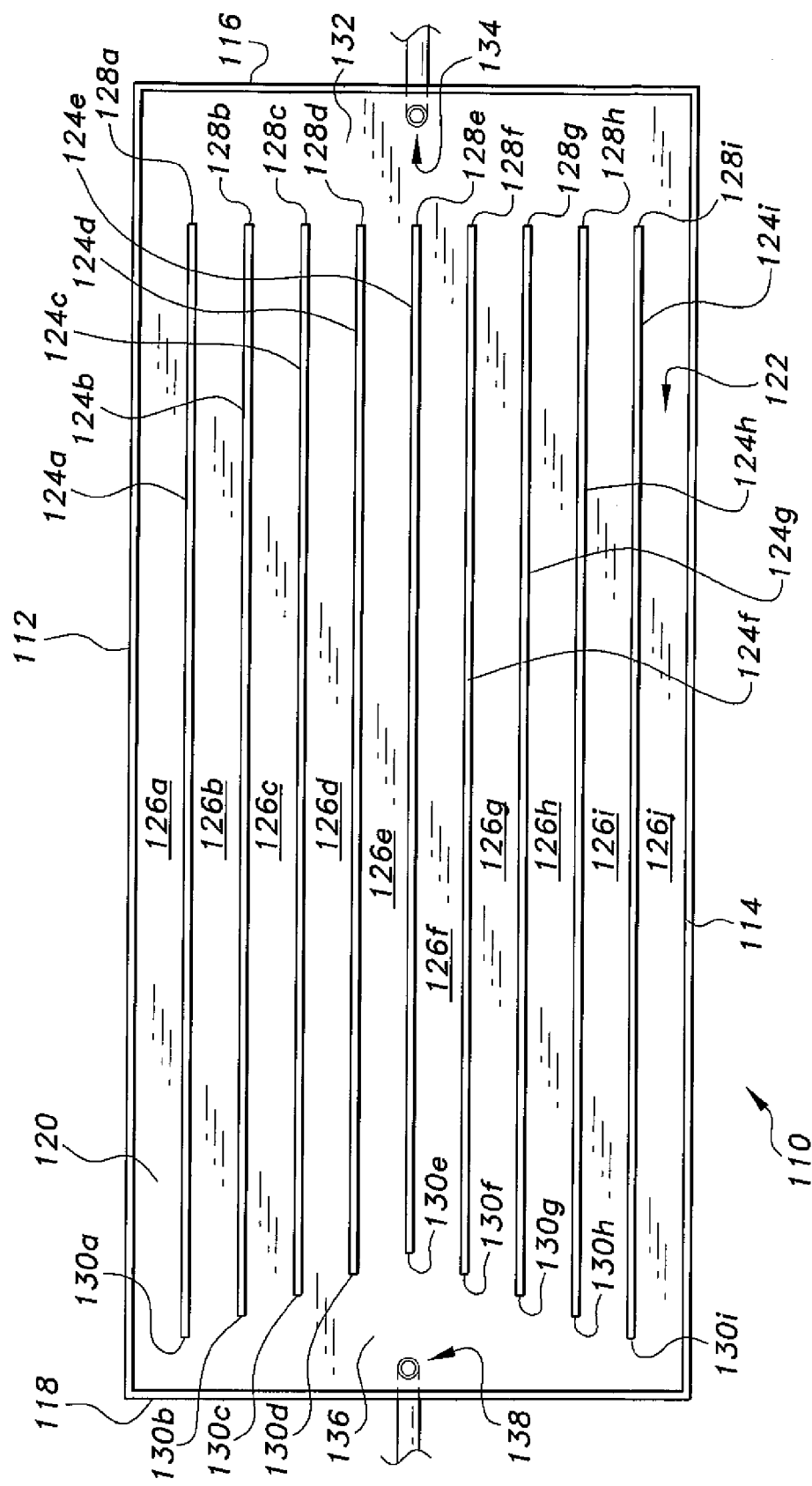
FIG. 3 is a diagrammatic top plan view of a second embodiment of a heat exchanger for photovoltaic panels according to the present invention, illustrating its internal configuration.
Figure 4A:
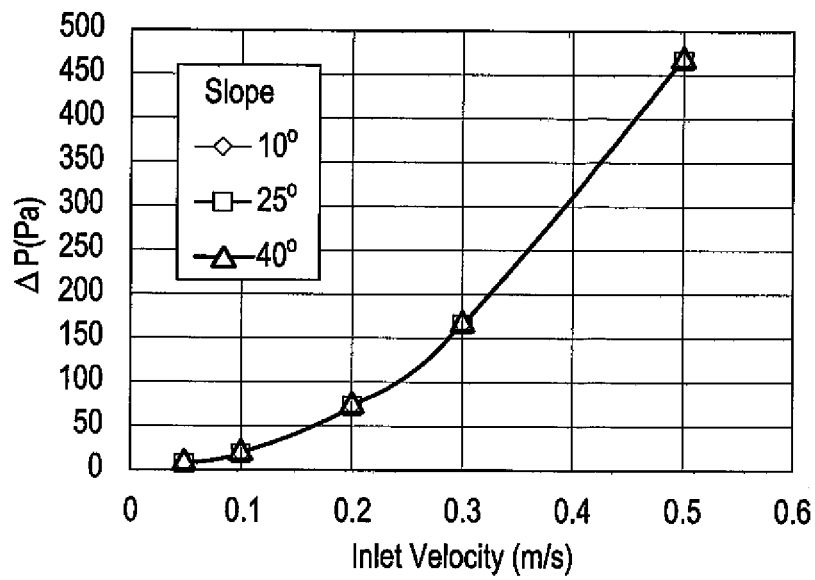
FIGS. 4A, 4B, and 4C are graphs illustrating the performance of the heat exchanger for photovoltaic panels of FIG. 2.
Figure 4B:
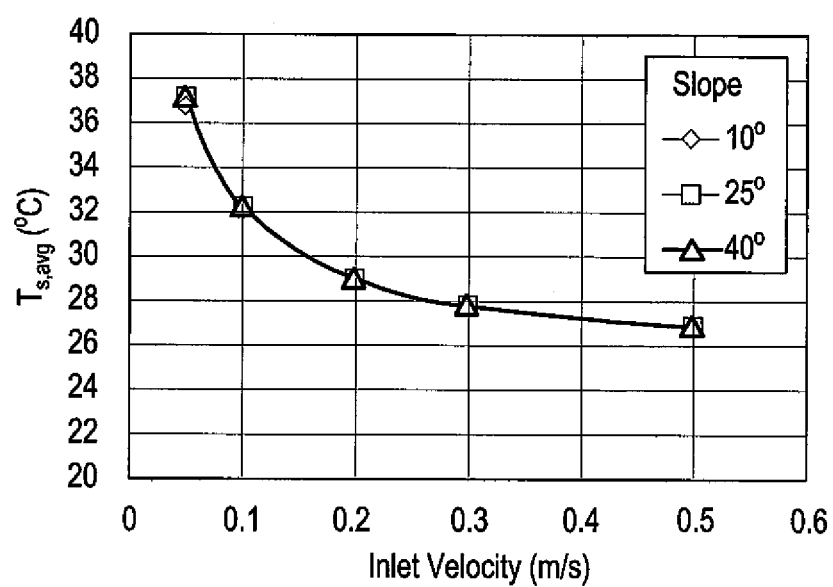
Figure 4C:
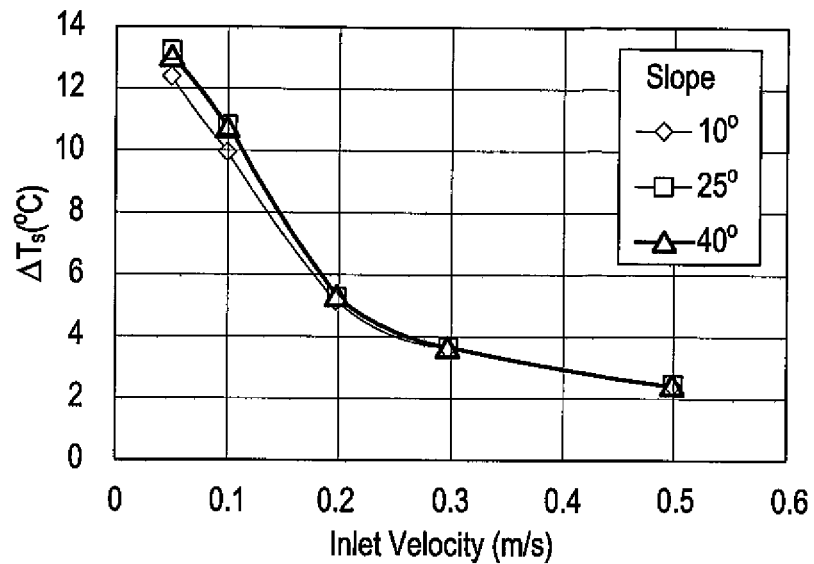

Among all the modifications considered, the width of the header proved to be the most important. Wider headers on the inlet side resulted in better distribution of the flow among the channels, as shown in the graphs of FIGS. 4A through 4C for the laterally offset inlets and the corresponding header configuration of FIG. 2, and in the graphs of FIG. 5A through 5C for the embodiment with centered inlet and outlet, as shown in FIG. 3. Wider headers also resulted in lower pressure drop, which improved the heat transfer per unit pumping power for the heat exchanger.

The positioning of the inlet and outlet also proved to be important in controlling the amount of fluid that entered the middle channels. When the inlet and outlet were placed at corners, as in ten and twenty parallel channels designs with and without wider headers, and in designs with tapered headers, almost the entire flow moved through the first few and last few channels.

Varying the channel wall lengths to form a tapered arrangement of channels did not provide significant improvement to the thermal performance on its own, but it proved to be useful for refining the flow distribution after using such modifications as variation of header width and inlet and outlet positioning. This was used in the centered-inlet-and-outlet embodiment shown in FIG. 3, in which channel wall lengths were tapered on the outlet header side to reduce the temperature gradient on the outlet-side corners. Upon comparing the average channel velocities of the heat exchanger embodiments of FIGS. 1 through 3 with the average channel velocities of the basic parallel channel design, significant improvement in flow distribution can be noticed.

To select the best layout designs, three performance metrics (i.e., average surface temperature, surface temperature non-uniformity, and heat transfer per unit pumping power) were used to sort and select the better designs. In the first step, five designs with the highest average temperature were discarded. Next, the five designs with lowest values of heat transfer per unit pumping power were discarded. Finally, the two designs with the lowest value of surface temperature non-uniformity, i.e., the embodiments of FIGS. 2 and 3, were selected. These two embodiments showed almost the same values of average surface temperature and surface temperature non-uniformity.

FIG. 1 provides an illustration of an exemplary heat exchanger, e.g., the embodiment of the heat exchanger 110 of FIG. 3, shown installed beneath a photovoltaic (PV) panel P. The PV panel P is conventional, receiving solar (or other electromagnetic energy) and converting that energy to electrical power. The electrical input and output lines are not shown in FIG. 1, but are conventional. The heat exchanger 110 forms a box-shaped fluid enclosure having opposed parallel first and second side walls 112 and 114, and opposed first and second end walls 116 and 118. A lower surface 120 serves as the floor of the heat exchanger 110. The solar panel P is placed atop the heat exchanger to serve as an upper surface parallel to the lower surface 120. Alternatively, the heat exchanger may be provided with a separate upper surface distinct from the solar panel P, if desired. The side walls 112 and 114, end walls 116 and 118, and lower and upper surfaces 120 and solar panel P define an enclosure and internal volume 122 for the heat exchanger enclosure 110.

The solar panel P also has opposed first and second sides S1 and S2 and opposed first and second ends E1 and E2. (The left end portion of the solar panel P has been broken away in FIG. 1 to show the underlying heat exchanger 110, but the periphery of the left end portion of the solar panel P is shown in broken lines in FIG. 1.) The dimensions of the side walls 112, 114 and end walls 116, 118 of the heat exchanger 110 have been selected to produce a heat exchanger enclosure congruent with the perimeter of the solar panel P, as shown in FIG. 1 of the drawings.

The heat exchanger 110 is provided with a plurality of parallel baffles 124a through 124i. The baffles 124a-124i are also parallel to the two side walls 112 and 114 and extend between the lower surface 120 and the overlying solar panel P defining the upper surface of the heat exchanger. The nine baffles 124a through 124i, along with the two side walls 112 and 114, form a total of ten mutually parallel coolant channels 126a through 126j, as shown in FIG. 3. It will be seen that more or fewer baffles may be provided to provide more or fewer channels, if desired.

Each of the baffles 124a through 124i has a first end 128a-128i (shown in the plan view of FIG. 3), and an opposite second end 130a-130i. The first ends 128a-128i of all of the baffles 124a through 124i are parallel to one another and equidistant from the first end wall 116. The first end wall 116, side walls 112 and 114, and the parallel ends 128a through 128i of the baffles 124a-124i define a rectangular first or inlet plenum or header 132. A first or inlet port 134 is installed through the lower surface 120 of the heat exchanger 110 adjacent the first end wall 116 and laterally centered between the two side walls 112 and 114.

In contrast, the second ends 130a through 130i of the baffles 124a through 124i are staggered relative to one another. In the example of FIGS. 1 and 3, the first and last baffles 124a and 124i have the greatest lengths so that their respective ends 130a and 130i are closest to the second end wall 118. The medial baffle 124e has the shortest length, its second end 130e being spaced farthest from the second end wall 118. The baffles 124a through 124i vary in length to define a non-rectangular second or outlet header 136, more specifically, an outlet header 136 having the shape of an isosceles triangle, i.e., being V-shaped with the vertex extending into the enclosure along its centerline. This arrangement is configured to maximize the distances between the baffle ends 130a through 130e and the second or outlet port 138, which is installed through the lower surface 120 adjacent the second end wall 118 and positioned medially between the two side walls 112 and 114. This configuration substantially equalizes coolant flow through each of the channels 126a through 126j.

Figure 2:
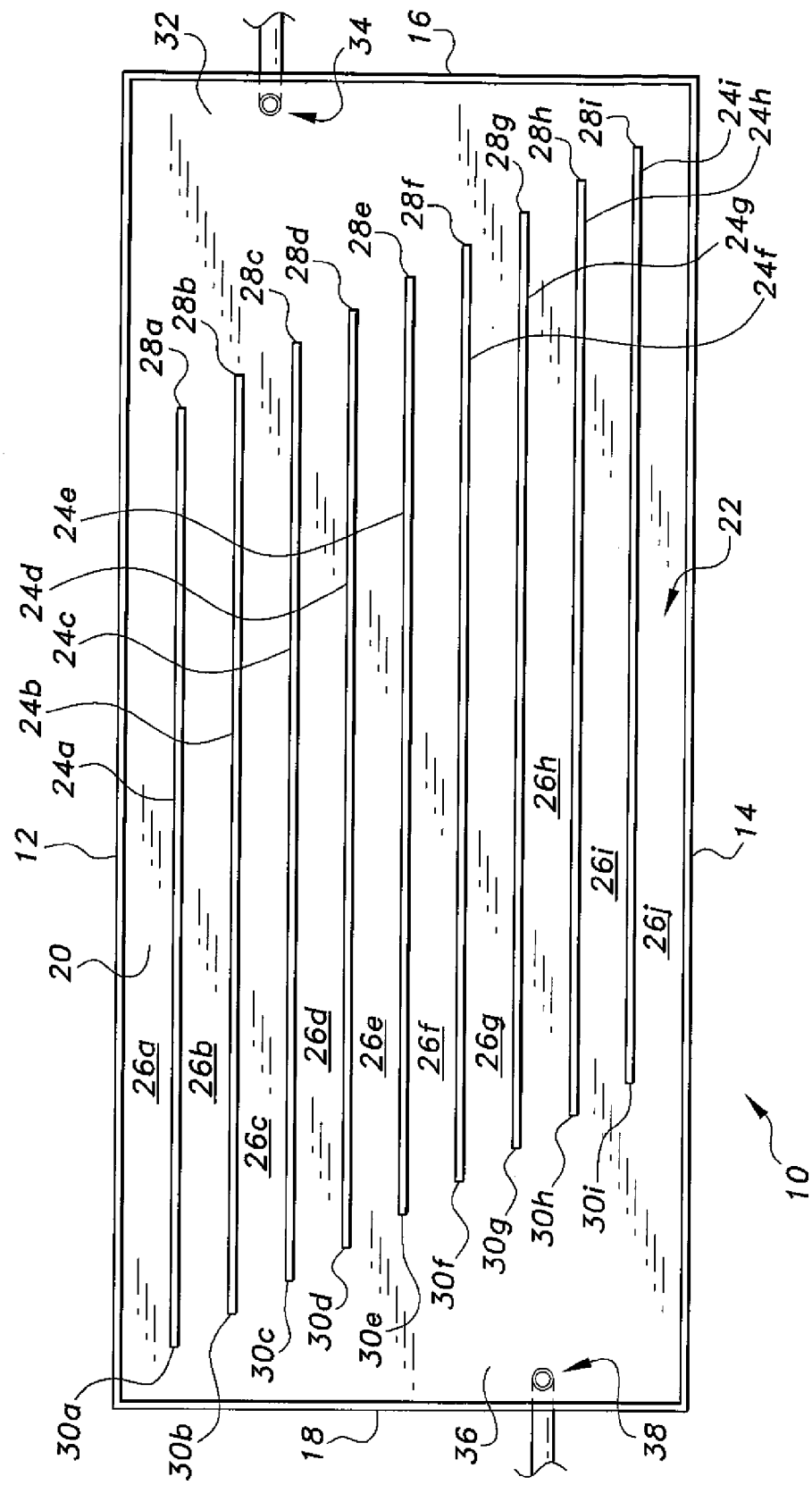
FIG. 2 is a diagrammatic top plan view of a first embodiment of a heat exchanger for photovoltaic panels according to the present invention, illustrating its internal configuration.

FIG. 2 provides a top plan view of a first embodiment of the heat exchanger 10. The heat exchanger 10 includes the same components as the heat exchanger 110 of FIGS. 1 and 3, having opposed parallel first and second side walls 12 and 14, opposed parallel first and second end walls 16 and 18, and a lower surface 20, the upper surface comprising the PV panel P (not shown in FIG. 3, but as shown in FIG. 1). The side walls 12 and 14, end walls 16 and 18, lower and upper surfaces 20 and solar panel P define an enclosure and internal volume 22 for the heat exchanger enclosure 10, similar to the analogous components of the heat exchanger 110 of FIGS. 1 and 3.

The heat exchanger 10 is provided with a plurality of parallel baffles 24a through 24i, analogous to the baffles 124a through 124i of the heat exchanger 110 of FIGS. 1 and 3. The baffles 24a-24i are also parallel to the two side walls 12 and 14, and extend between the lower surface 20 and the overlying solar panel P defining the upper surface of the heat exchanger 10. The nine baffles 24a through 24i, along with the two side walls 12 and 14, form a total of ten parallel coolant channels 26a through 26j, as shown in FIG. 2. The baffles 24a through 24i and their associated channels 26a through 26j are substantially equal in length to one another. It will be seen that more or fewer baffles may be provided to provide more or fewer channels, if desired.

Each of the baffles 24a through 24i has a first end 28a through 28i, and an opposite second end 30a through 30i. It will be seen that while the first ends 28a through 28i define a straight line, the ends are staggered relative to one another so that the first end 28a of the first baffle 26a is set farthest from the first end wall 16, and the first end 28i of the last baffle 24i is set closest to the first end wall 16. This configuration defines a first or inlet header 32 having the shape of a right triangle, the right angle being the corner of the exchanger 10 at the intersection of the first side wall 12 and the first end wall 16. The first or inlet port 34 is located through the lower surface 20 adjacent the first end wall 16, and is laterally offset to be closer to the first side wall 12 than to the second side wall 14. Thus, the arrangement of the staggered first ends 28a through 28i of the baffles 26a through 26i is configured to maximize the distances between the baffle first ends 28a through 28i and the first or inlet port 34 installed through the lower surface 20 adjacent the first end wall 16 and positioned closer to the first side wall 12.

The opposite second or outlet end of the heat exchanger 10 is configured similar to the first or inlet end, but the orientation of the right triangular shape of the second or outlet header 36 is opposite that of the first or inlet header 32. It will be seen that the second ends 30a through 30i define a straight line, the ends 30a-30i being staggered relative to one another, as in the case of the first baffle ends 28a through 28i. However, the second end 30a of the first baffle 26a is set closest to the second end wall 18 and the second end 30i of the last baffle 24i is set farthest from the second end wall 16. This configuration defines a second or outlet header 36 having the shape of a right triangle, the right angle being defined by the corner of the exchanger 10 at the intersection of the second side wall 14 and the second end wall 18. The second or outlet port 38 is located through the lower surface 20 adjacent the second end wall 18, and is laterally offset to be closer to the second side wall 14 than to the first side wall 12. Thus, the arrangement of the staggered second ends 30a through 30i of the baffles 26a through 26i is configured to maximize the distances between the baffle second ends 30a through 30i and the second or outlet port 38 installed through the lower surface 20 adjacent the second end wall 18 and positioned closer to the second side wall 14. This configuration, along with the configuration of the first or inlet header 32, substantially equalizes coolant flow through each of the channels 26a through 26j.

In order to further investigate the selected embodiments, their performance was investigated for a range of inlet velocities at multiple slopes (with the exchanger 10 or 110 at an angle with respect to horizontal). The results of this investigation are presented in FIGS. 4A through 4C for the heat exchanger 10 of FIG. 2, and in FIGS. 5A through 5C for the heat exchanger 110 of FIG. 3. The inlet velocity was varied from 0.05 m/s to 0.5 m/s and three slopes were considered, 10°, 25° and 40°.

Figure 5A:
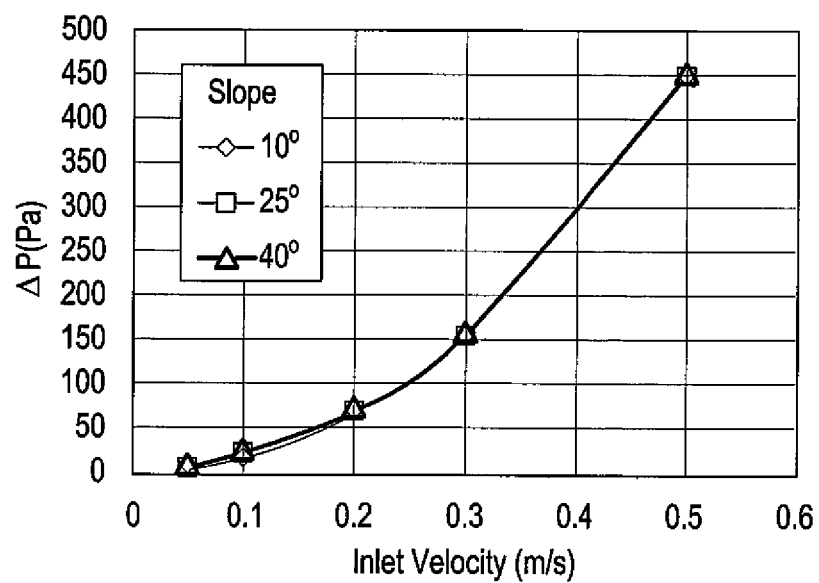
FIGS. 5A, 5B, and 5C are graphs illustrating the performance of the heat exchanger for photovoltaic panels of FIG. 3.
Figure 5B:
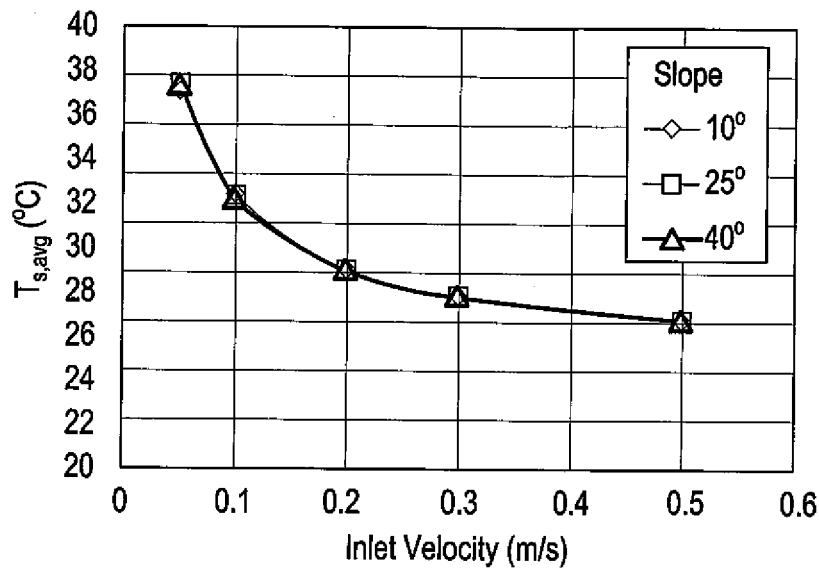
Figure 5C:
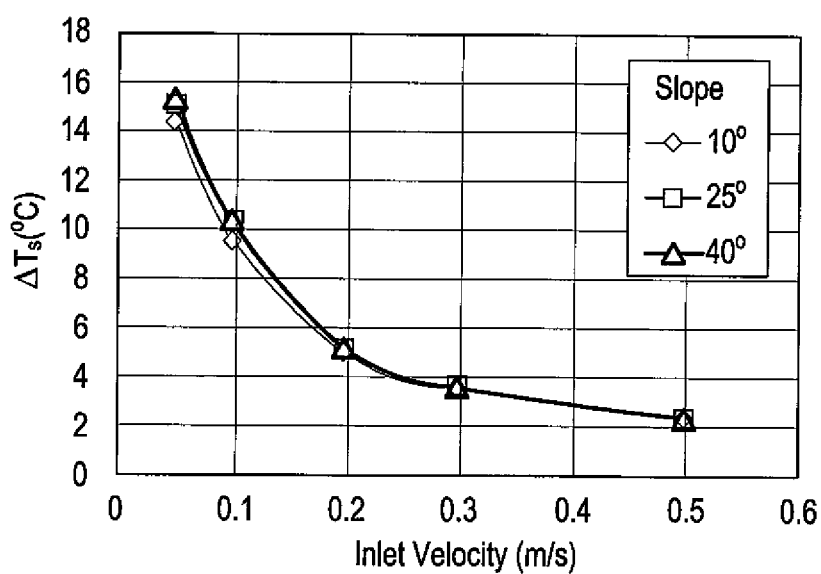

FIGS. 4A and 5A show the pressure drop (ΔP) across the respective heat exchanger embodiments 10 and 110 of FIGS. 2 and 3. As expected the pressure drop increased with increasing inlet velocities, but it showed no dependence on the slope of the heat exchanger. Maximum pressure drop was 467 Pa for the heat exchanger 10 of FIG. 2, and 449 Pa for the heat exchanger 110 of FIG. 3 at an inlet velocity of 0.5 m/s. On the other hand, the average surface temperature ($T_s$) shown in FIGS. 4B and 5B, decreased with increasing inlet velocity. Again, no significant effect of the slope was observed. The final two graphs, FIGS. 4C and 5C, show the variation of surface temperature non-uniformity ($\Delta T_s$) with inlet velocity and slope for the heat exchangers 10 and 110 of FIGS. 2 and 3, respectively. Unlike the previous parameters, $\Delta T_s$ did show dependence on the slope of the heat exchanger for low inlet velocities (between 0.05 m/s and 0.1 m/s), but the variation in $\Delta T_s$ for the three slopes was around 1° C. Between the two configurations, the heat exchanger 10 of FIG. 2 showed slightly better temperature uniformity at low velocities than the heat exchanger 110 of FIG. 3 ($\Delta T_s$=13° C. at 0.05 m/s and a slope of 40° for the heat exchanger 10 of FIG. 2, compared with $\Delta T_s$=15.5° C. for the heat exchanger 110 of FIG. 3 under the same conditions). The heat transfer per unit pumping power of the heat exchanger 110 of FIG. 3 was around 5.5% better than the heat exchanger 10 of FIG. 2.

The design and selection process for a heat exchanger involved making several modifications to a basic ten parallel channels layout and studying which of the changes provided improvements in the performance of the heat exchanger, as measured by the performance metrics. From the design investigation, the following conclusions were drawn. (1) A change in the number of channels did not cause any appreciable change in the thermal performance of the heat exchanger. In the series-parallel arrangements, an increase in the number of channels from 10 to 18 resulted in the pressure drop increasing from 899.3 Pa to 5028 Pa without any significant improvement in performance. (2) Width of the header proved to be the most crucial design parameter. In general, it was found that wider inlet header improved uniform flow distribution that leads to uniform temperature in the entire PV module. This aspect is very important for efficient electrical performance of the PV module. (3) Very wide headers on the outlet side resulted in stagnation towards the corners, which increased the temperature gradient. (4) Tapered positioning of the channels proved useful in distributing flows to channels and regions where other arrangements were not uniformly distributed. (5) Tapered header layouts provided the best results with wide inlet headers. (6) The positioning of the inlet and the outlet is also critical to ensure that sufficient quantity of flow enters the middle channels.

From this design approach, it is recommended that the first approach should be to vary the width of the inlet and outlet headers until a reasonable temperature distribution is achieved in the entire heat exchanger channels. After this, tapers may be applied to the headers to further refine the temperature distribution.

It is to be understood that the present invention is not limited to the embodiments described above, but encompasses any and all embodiments within the scope of the following claims.

We claim:

1. A uniformly cooled photovoltaic panel, comprising:
a flat photovoltaic panel having a front face and a rear face;
a parallel channel heat exchanger enclosure attached to the rear face of the photovoltaic panel, the heat exchanger enclosure having:
opposed first and second side walls, opposed first and second end walls, and opposed upper and lower surfaces, the side walls, end walls, and upper and lower surfaces defining an enclosure for containing a heat exchange fluid and adapted for attachment to a photovoltaic panel;
an inlet port disposed through the lower surface of the enclosure adjacent the first end wall thereof;
an outlet port disposed through the lower surface of the enclosure adjacent the second end wall thereof;
a plurality of parallel baffles disposed between the upper and lower surfaces of the enclosure, the baffles including at least a first baffle, a medial baffle, and a last baffle, the baffles and side walls being parallel to one another, the baffles and side walls defining a corresponding plurality of parallel coolant channels dividing the enclosure into a plurality of flow paths for the heat exchange fluid, each of the baffles having a first end spaced apart from the first end wall and a second end spaced apart from the second end wall;
an inlet header defined between the first ends of the baffles, the side walls and the first end wall; and
an outlet header defined between the second ends of the baffles, the side walls and the second end wall, wherein the inlet port and the outlet port are disposed substantially along a centerline of said enclosure, the inlet header being substantially rectangular in shape, the outlet header having a vertex disposed on the centerline, each of the baffles having a length associated therewith such that one of the plurality of baffles is positioned along the centerline and has a shortest length of the plurality of baffles, the lengths of ones of the plurality of baffles positioned between the centerline and a first one of the side walls incrementally increasing in length, the lengths of ones of the plurality of baffles positioned between the centerline and a second one of the side walls incrementally increasing in length, the plurality of baffles being symmetric about the centerline with respect to the lengths thereof, the inlet port opening into the inlet header and the outlet port opening into the outlet header.

2. The uniformly cooled photovoltaic panel according to claim 1, wherein the rear face of the photovoltaic panel defines the upper surface of the enclosure.

3. A heat exchanger for a photovoltaic panel, comprising:
an enclosure having opposed first and second side walls, opposed first and second end walls, and opposed upper and lower surfaces, the side walls, end walls, and upper and lower surfaces defining an enclosure for containing a heat exchange fluid and adapted for attachment to a photovoltaic panel;
an inlet port disposed through the lower surface of the enclosure adjacent the first end wall thereof;
an outlet port disposed through the lower surface of the enclosure adjacent the second end wall thereof;
a plurality of parallel baffles disposed between the upper and lower surfaces of the enclosure, the baffles including at least a first baffle, a medial baffle, and a last baffle, the baffles and side walls being parallel to one another, the baffles and side walls defining a corresponding plurality of parallel coolant channels dividing the enclosure into a plurality of flow paths for the heat exchange fluid, each of the baffles having a first end spaced apart from the first end wall and a second end spaced apart from the second end wall;

an inlet header defined between the first ends of the baffles, the side walls and the first end wall; and an outlet header defined between the second ends of the baffles, the side walls and the second end wall, wherein the inlet port and the outlet port are disposed substantially along a centerline of said enclosure, the inlet header being substantially rectangular in shape, the outlet header having a vertex disposed on the centerline, each of the baffles having a length associated therewith such that one of the plurality of baffles is positioned along the centerline and has a shortest length of the plurality of baffles, the lengths of ones of the plurality of baffles positioned between the centerline and a first one of the side walls incrementally increasing in length, the lengths of ones of the plurality of baffles positioned between the centerline and a second one of the side walls incrementally increasing in length, the plurality of baffles being symmetric about the centerline with respect to the lengths thereof, the inlet port opening into the inlet header and the outlet port opening into the outlet header.

4. The heat exchanger for a photovoltaic panel according to claim 3, further comprising a photovoltaic panel disposed atop the enclosure, the photovoltaic panel having a rear face defining the upper surface of the enclosure.

\* \* \* \* \*